Feb. 17, 1931.                    O. HAENTJENS                    1,793,396
                                 DIAPHRAGM VALVE
                              Filed June 21, 1928
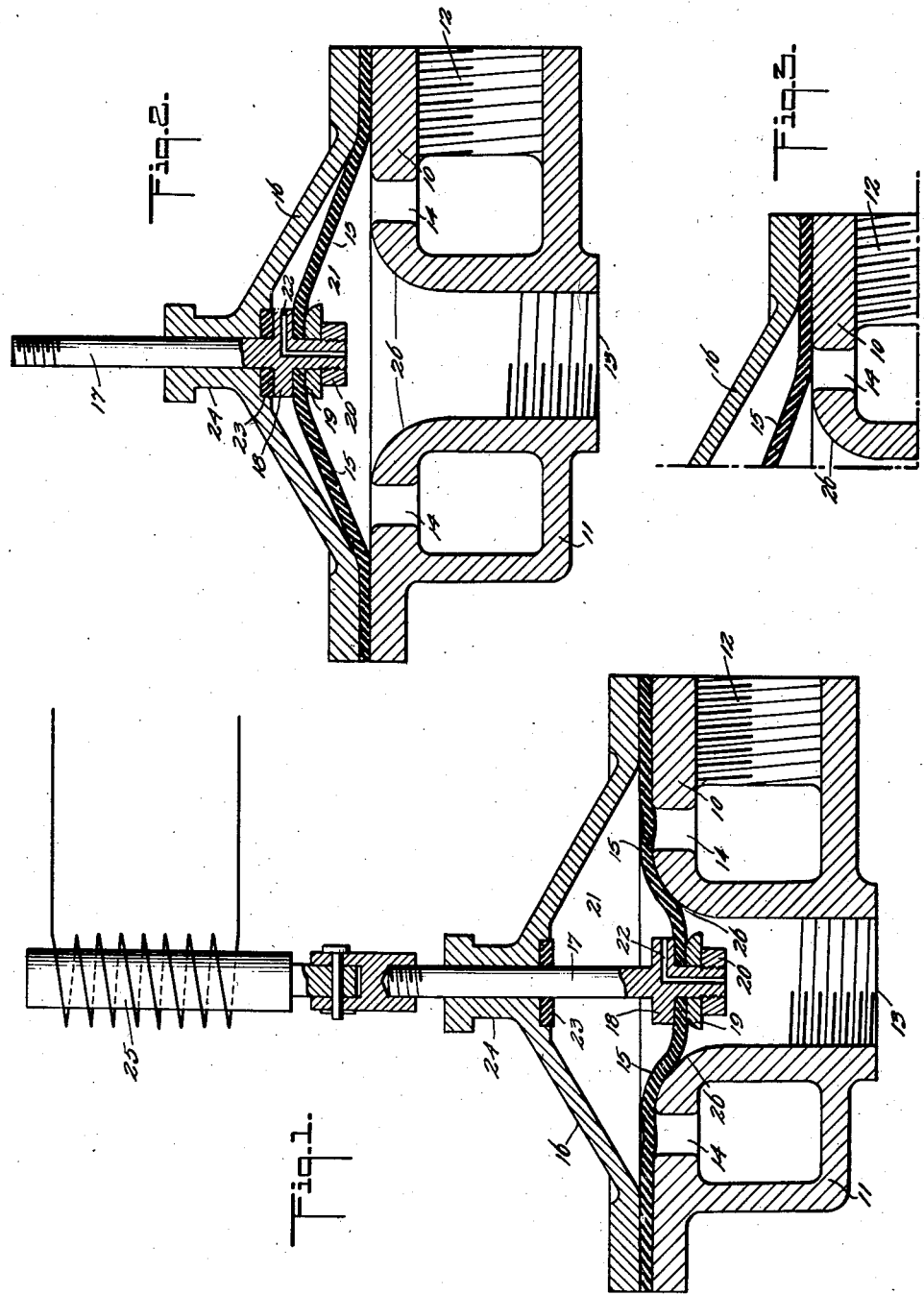
INVENTOR
OTTO HAENTJENS
by his attorneys
Howson and Howson Patented Feb. 17, 1931

1,793,396

UNITED STATES PATENT OFFICE

OTTO HAENTJENS, OF HAZLETON, PENNSYLVANIA

DIAPHRAGM VALVE

Application filed June 21, 1928. Serial No. 287,264.

This invention relates to diaphragm valves.

The object of the invention is to improve the construction of a valve in which a flexible diaphragm is the port sealing element.

The improvements are intended to give a tighter sealing of the ports, an easier operation of the diaphragm and less wear on the diaphragm.

The preferred embodiment of the invention is described hereinafter and is illustrated in the accompanying drawings.

Fig. 1 is a central sectional view of the valve in closed position;

Fig. 2 is a similar view of the valve in open position;

Fig. 3 is a detail showing the condition at one port while the valve is being opened.

The valve has a seat 10 formed as the top wall of an annular hollow base 11. A threaded opening 12 is formed in the outer wall of the base and through the center of the base and seat is a passageway 13 threaded at the lower end. The seat 10 has a series of ports 14 through it communicating with the hollow interior of the base.

A flexible diaphragm 15 overlies the seat and is secured thereto at its outer portion by a conical cover plate 16. An actuating rod 17 extends through a boss on the cover plate and is secured to the diaphragm in the following manner. The rod has an annular flange 18 near its lower end so that when the rod is put through a central opening in the diaphragm, the flange limits the extension therethrough and forms an abutment against which the diaphragm is pressed by a nut 19. A locking nut 20 also is provided.

To communicate the chamber 21 between the diaphragm and the cover plate with the central passageway 13, there is a channel 22 extending through the rod 17 to the flange and thence through the flange.

A sealing washer 23 is put in a recess in the cover plate around the rod 17 and, when the valve is open as in Fig. 2, this washer is compressed by flange 18 and sealed against leakage along the rod. A stuffing box could be provided in the boss 24 if desired and, where the valve is used in a liquid line, a stuffing box is preferable since then leakage is undesirable at all times.

The valve is actuated by a solenoid 25 connected to the valve rod 17 as shown in Fig. 1.

An important feature is the curved shoulder 26 of the valve seat which is formed by the gradually increasing diameter of the wall of passageway 13. This wall merges gradually into the seat 10 at the region of the ports 14 and forms a continuous surface with the seat.

The valve shown is designed for use in liquid or air lines and is to be inserted in the line in such a way that the pressure differential is in the direction from opening 13 to opening 12. If used in a pressure line, the pump or pressure producing means delivers to the central passageway 13 while in a vacuum line, the pump or exhauster is connected to draw from the interior of the base through opening 12.

Normally the valve is held in the Fig. 1 position by the pressure fluid which acts on the whole upper surface of the diaphragm, the chamber 21 having a flow connection with the higher pressure side of the valve through passageway 22. In this position of the valve, it is to be noted that the diaphragm overlies the ports 14 and the curved shoulder and is held tightly thereon by the pressure fluid. The diaphragm is not subjected to any cutting action where it bends over the shoulder because of the continuity of surface between the valve seat and the shoulder.

When the valve is to be opened, the rod 17 is drawn upward by the solenoid. Because of the flexibility of the diaphragm the whole of it is not lifted at once against the pressure in chamber 21 but the action is one of peeling the diaphragm rather than of lifting it bodily. The ports are uncovered gradually as Fig. 3 shows. By reason of this gradual lifting or peeling off of the diaphragm, the size of the solenoid is much smaller than commonly used since very little force is needed.

The chief advantages of this valve are its tightness of sealing when in closed position, its ease of operation and its freedom from corners or edges which would cut the diaphragm or bend it too sharply.

I claim—

1. In a valve, a seat having a passageway opening therethrough and a shoulder forming the rim of the passageway, the surface of the said shoulder being curved and continuous with the surface of the wall of the passageway, a port in the seat and a flexible sealing element secured beyond the rim of the port and adapted to overlie the seat and the shoulder to seal the port from the said passageway in one position and to be peeled from the said shoulder and seat to put the port and passageway in communication.

2. In a valve, a seat having a passageway opening therethrough and a shoulder forming the rim of the passageway, the surface of the said shoulder being curved and continuous with the surface of the wall of the passageway, a port in the seat, and a flexible sealing element secured to the seat at one side of the port away from the shoulder and adapted to overlie the seat and shoulder and to be peeled therefrom.

3. In a valve, a circular seat, a passageway opening through the seat, the wall of the passageway merging gradually into the seat to form a shoulder with a curved surface continuous therewith, a port in the seat and a flexible diaphragm secured to the outer portion of the seat and adapted to overlie the seat and the shoulder to seal the port from the passageway in one position and to be peeled from the said shoulder and seat to put the port and passageway in communication.

4. In a valve, a circular seat, a passageway opening through the seat, the wall of the passageway merging gradually into the seat to form a continuous surface therewith, a port in the seat, a flexible diaphragm secured to the outer portion of the seat, a cover forming a chamber over said diaphragm, means providing communication between said chamber and the said passageway and means to actuate the diaphragm.

5. In a valve, a circular seat, a passageway opening through the seat, the wall of the passageway merging gradually into the seat to form a continuous surface therewith, a port in the seat, a flexible diaphragm secured to the outer portion of the seat, a cover forming a chamber over said diaphragm, an actuating rod extending through the cover and secured to the mid-area of the diaphragm and a fluid connection between said chamber and said passageway.

In testimony whereof I have signed my name to this specification.

OTTO HAENTJENS.